United States Patent [19]
Hilgert

[11] 3,884,260
[45] May 20, 1975

[54] DIAPHRAGM VALVE APPARATUS AND CONTROL SYSTEMS EMPLOYING SUCH VALVE APPARATUS

[75] Inventor: Adolph J. Hilgert, Mequon, Wis.

[73] Assignee: Johnson Service Company, Milwaukee, Wis.

[22] Filed: Oct. 9, 1973

[21] Appl. No.: 404,646

Related U.S. Application Data
[62] Division of Ser. No. 222,603, Feb. 1, 1972, abandoned.

[52] U.S. Cl. ............... 137/469; 137/537; 137/541
[51] Int. Cl. ..................... G05d 16/02; F16k 17/06
[58] Field of Search ................... 137/469, 475–478, 137/510, 537

[56] References Cited
UNITED STATES PATENTS

| | | | |
|---|---|---|---|
| 2,678,187 | 5/1954 | Peters | 137/510 UX |
| 2,871,877 | 2/1959 | Work | 137/469 |
| 3,039,699 | 6/1962 | Allen | 137/537 X |
| 3,053,271 | 9/1962 | Crottenden, Jr. | 137/510 X |
| 3,195,556 | 7/1965 | Norstrud et al. | 137/469 X |
| 3,331,389 | 7/1967 | Kirk | 137/537 X |

*Primary Examiner* — Robert G. Nilson
*Attorney, Agent, or Firm* — Andrus, Sceales, Starke & Sawall

[57] ABSTRACT

A unit ventilator system includes a number of special diaphragm valves, each of which has a pair of chambers separated by a common diaphgragm with a control passage interconnecting the chambers. A spring loaded valve operatively opens and closes an inlet passageway to one chamber. As an on-off valve, the control passageway is connected to the output passageway downstream of an orifice. The second chamber has a sealing wall engaged by the valve to reduce the effective area, so the incoming pressure must decrease below the opening pressure. An exhaust passageway extends from the second chamber sealing wall. A second valve apparatus has a second valve in the control passageway, with a mechanical actuator engaged after the diaphragm has moved a selected amount. The diaphragm unit moves with pressure increase until the second valve opens to transmit the pressure through the first chambers to the outlet. A regulating zero differential diaphragm pressure relief valve apparatus includes the inlet passageway normally closed by a valve unit. The first chamber is connected to an exhaust and by the control passageway to the second chamber to dampen the movement of the valve disc and in particular eliminates the chatter associated with the Bernulli effect.

6 Claims, 4 Drawing Figures

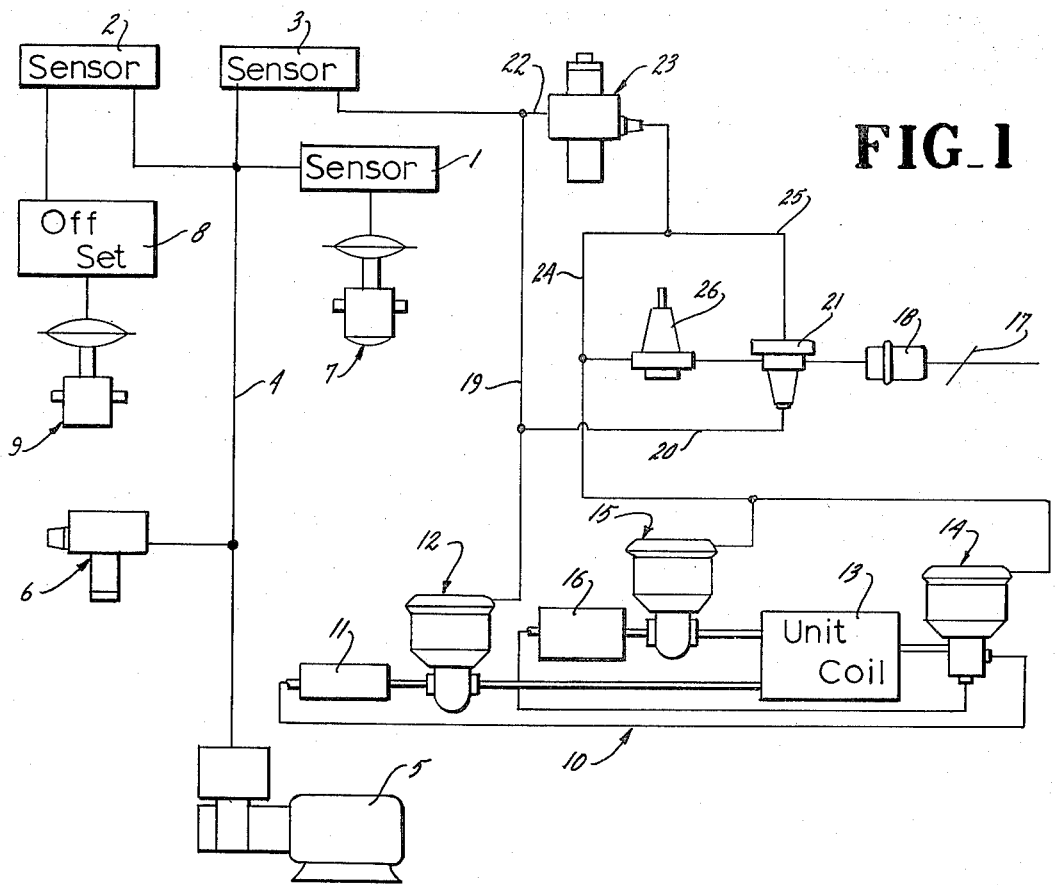
FIG_1
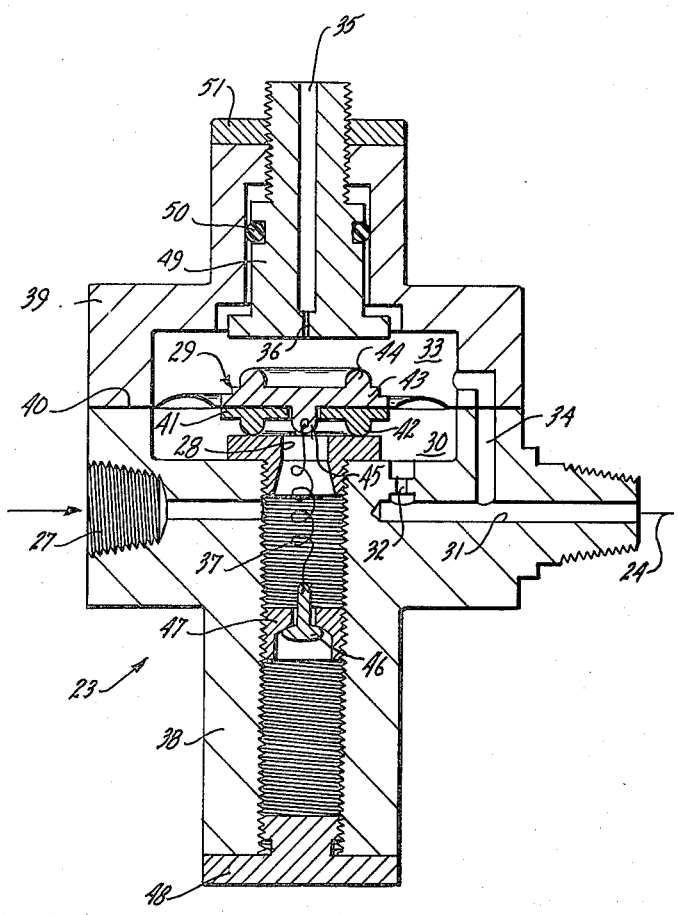
FIG_2

DIAPHRAGM VALVE APPARATUS AND CONTROL SYSTEMS EMPLOYING SUCH VALVE APPARATUS

This is a division of application, Ser. No. 222,603, filed Feb. 1, 1972, now abandoned.

BACKGROUND OF THE INVENTION

This invention relates to a diaphragm valve apparatus and to fluid control system incorporating such valve apparatus.

Fluid control systems such as pneumatic controls employ corresponding fluid pressures and flows for controlling and actuating various operators. For example, in environmental control systems, air and liquid flow control valves and dampers are actuated and positioned by fluid actuated positioning devices.

In control systems, certain positioning devices may be advantageously operated at selected pressure levels, either as an on-off device or an offset proportional control. For example, a variable control fluid signal may operate a first valve or damper positioner in a proportional manner. A second, similar positioner may, however, require an on-off actuation. Although separate, special valve structures for each control can, of course, be employed, this may require substantial revision of an existing system and further requires separate inventoring of the various types of valves. It would, of course, be desirable therefor to provide a common switchover valve which could be inserted into the circuit to produce the desired on-off type control. Thus, a unit ventilator control system may have a hot and cold water circulating system for circulating of corresponding water through a unit coil for controlling heating or cooling of air. A damper may also be provided to modulate the amount of the fresh air introduced into the system. The system should automatically transfer between the circulation of hot water through the coil unit and cold water through the coil unit at a selected condition which is established as an output pressure level of a pneumatic sensing system. Similarly, in other controls, various valves may desirably be operated in a selected sequence in response to a proportionately varying condition related pressure signal. The provision of separate positioning devices which will respond to the proper pressure range requires a substantial inventory to accommodate the multiplicity of signal ranges and various types of valves and damper positioners which are available and used by the fluid control industry.

Further, in such systems, particularly pneumatic control systems, the sensing inputs are preferably derived from a constant regulated pressure source. In a large complex system, of course, a regulated supply can be derived from a high pressure storage system employing a compressor having a pressure switch to start and stop the compressor and maintain a supply pressure in a storage tank at a level significantly above the operating pressures. The regulated flow and pressure is then derived from this relatively high pressure source through suitable reducing means to establish the desired lower operating pressure.

In relatively small systems and individual portions or zones of larger systems, and individual small compressor supply directly provided the air supply with the air compressor being operated as long as the system is in operation. This may reduce the cost and system complexity. However, where the supply must provide flow to a plurality of different systems or sub-systems, the air consumption can vary significantly with a consequent pressure fluctuation. This, of course, will interfere with optimum operation of the system.

SUMMARY OF THE INVENTION

This invention relates to diaphragm valve apparatus for fluid control systems and in particular a diaphragm valve apparatus having a pair of chambers separated by a common diaphragm member with specially controlled interconnection of the chambers establishing a modified valve response. A supply is connected to an inlet passageway means terminating in a first of the pair of chambers. A control passageway means interconnects the first inlet chamber to the second chamber with the diaphragm member having an associated valve means for operatively opening and closing of the inlet passageway means. A resilient means urges the valve means to close the passageway means until a selected supply pressure is established at which time the diaphragm member and associated valve means is moved to transmit the pressure through the control passageway means to the second chamber. The valve includes various auxiliary controls to provide an on-off operation, a subsequent proportional control or a constant pressure drop output.

As applied to an on-off valve control, the interconnecting coupling passageway means is derived from and connected to the output passageway to the downstream side of an orifice or other similar flow restriction means. The valve means is formed with a differential area such that after the initial opening the increased area will rapidly cause the valve to assume a fully open position. The flow restriction results in a relatively more rapid pressure within the first chamber to ensure rapid movement to the full open position. The pressure is also transmitted through the interconnecting or coupling passageway to the second chamber after the initial opening of the valve means. This will tend to move the diaphragm to the initial position. The second chamber, however, is provided with a sealing means engaged by the valve means and sealing off a portion of the valve means from the surrounding portion of the second chamber. Consequently, its effective area is less than the effective area of the valve member and diaphragm within the first chamber and equal pressures in the two chambers is ineffective to cause the valve member to return to its initial position under the force of a resilient means. However, if the supply pressure decreases by a selected amount the force of the resilient means will be sufficient to initiate a slight return movement of the valve member. The initial movement, of course, breaks the seal applied to the valve means within the second chamber and causes the diaphragm to move rapidly downwardly into the closing position. The seal of the second chamber is provided with an exhaust passageway including a flow restriction, permitting exhaust of the second chamber until the second seal is established. This prevents a build-up of the pressure corresponding to that in the first chamber until the second seal has been established. The restriction means will, of course, prevent instantaneous loss of the balancing pressure upon the initial breaking of the seal and thus maintain the rapid return switching action. The particular differential pressure required is directly related to the distance the valve means moves between the two sealing positions. An adjustable seat can be conveniently provided for the second valve chamber for adjusting the differential pressures required. The resilient means can be adjusted to vary the spring force and, accordingly, vary the pressures at which valve opening occurs.

Such an on-off valve has been employed as an adjustable set point valve in a unit ventilator system by connecting an output of a fluid sensor as the input to the first inlet passageway means of the above valve structure. The output of the valve was interconnected to modulate the cold water control units and to further actuate a pressure switching valve to maintain a minimum damper position. Until the pressure rose to the desired switchover level, the output of the sensor was connected to directly modulate and control the hot water flow and the damper position.

To establish a switch-over for sequencing of a series of operators the control pressure of the diaphragm valve apparatus is inserted to the input side of a selected operator and constructed to prevent operation of the selected operator until the pressure rises to a selected level. For this particular construction, a second valve means is provided in the chamber coupling passageway. The inlet chamber is subjected continuously to the inlet pressure through a suitable by-pass passageway. The secondary valve means is provided with a mechanical actuator engaged after the diaphragm has moved a selected amount. Thus, the input pressure must rise to a selected level after which the valve means opens to transmit the pressure of the first chamber into the second chamber. The output pressure is taken from the second chamber. With the output of a pressure sensor connected to the inlet passageway, the sensor pressure must rise to a selected pressure level to move the diaphragm unit sufficiently to open the secondary valve means. When such pressure is established, however, the second valve means opens to transmit the pressure of the first chamber to the second chamber and thereby to the outlet.

The second or output chamber is provided with an orifice for exhausting of the second chamber. The second valve means includes a valve member aligned with the orifice and normally spaced therefrom. As the pressure rises and moved the diaphragm unit and the attached second valve means, the valve stem moves into engagement with and closes the exhaust orifice. Any further movement of the diaphragm opens the second valve passageway to transmit the inlet pressure to the output chamber for actuating of the pneumatic operator or other control for all subsequent pressures.

to maintain a regulated output pressure in a variable flow supply system, the diaphragm valve apparatus is constructed to introduce a variable pressure drop at the supply pressure line to maintain a constant supply line pressure with flow changes. The diaphragm valve apparatus includes the inlet passageway normally closed by the valve means. When the inlet pressure rises to a selected level, the inlet passageway opens to the first chamber which is also connected to an exhaust pressure means to variably exhaust the supply line and prevent the pressure from rising above the selected level. The coupling passageway which interconnects the first chamber to the second chamber includes an orifice. This tends to dampen the movement of the valve disc and in particular eliminates the chatter associated with the Bernaulli effect. The present invention of the device thus provides a zero differential pressure relief valve to maintain a very accurately controlled supply pressure to a control system.

BRIEF DESCRIPTION OF THE DRAWINGS

The drawings furnished herewith illustrate preferred embodiments of the present invention in which the above advantages and features are clearly disclosed as well as others which will be readily understood from the following description of the illustrated embodiments.

In the drawings:

FIG. 1 is a schematic illustration of an environmental conditioning control system employing pneumatic sensing and signalling for operating of fluid actuated operators or positioning devices;

FIG. 2 is a cross-sectional enlarged view of a two-position valve with an adjustable set point control and a differential pressure response;

DESCRIPTION OF THE ILLUSTRATED EMBODIMENTS

Figure 3:
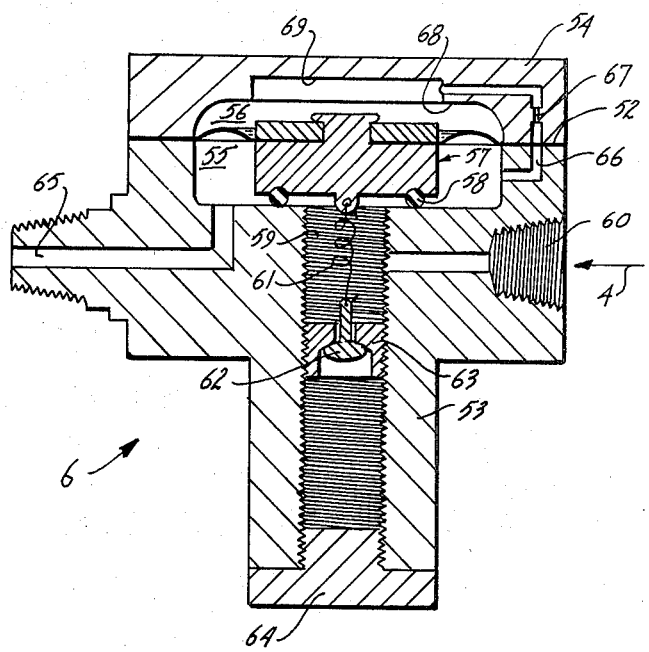
FIG. 3 is an enlarged cross-sectional view of a zero differential relief valve shown in FIG. 1 for maintaining a constant supply pressure to the sensing units with variable flow of the sensing units.

Referring to the drawing and particularly to FIG. 1, the present invention is shown in connection with a plurality of condition sensitive means or sensors 1, 2 and 3 which may, for example, be room thermostats of a pneumatic variety. The sensors 1, 2 and 3 are connected to a common pressure air supply line 4 which is interconnected to the output of a compressor 5. A pneumatic system is described although the invention can be applied to other fluid systems. For example, in a pneumatic environmental control, the sensors 1, 2 and 3 may be the conventional leak port type pneumatic sensors adapted to receive a preselected constant supply pressure and provide a modulated output pressure in accordance with and in proportion to the sensed temperature. In a direct acting unit, the higher temperature the higher the output pressure from the respective sensors. The compressor 5 is adapted to establish an output pressure in excess of the desired regulated supply. A special regulator 6 is connected to the line 4 to establish and maintain a predetermined constant supply pressure in the line 4. The regulator 6 provides a continuous variable bleed of the pressure above a selected level to reduce and maintain the pressure at a desired level.

The outputs of the respective sensors 1, 2 and 3 are shown connected to control various operators in different modes to clearly illustrate various valve apparatus constructed in accordance with the teaching of the present invention. The sensor 1 is shown directly connected to a diaphragm actuated valve 7 to provide direct action in accordance with the proportioning of the sensor 1. The valve 7, as well as the other similar valves and operators or positioners are advantageously the conventional diaphragm type units widely employed in the pneumatic control industry and no further description thereof is given. They may, of course, be any other suitable unit which can be driven from a pneumatic signal directly or through a suitable transducer.

The sensor 2 is connected through a special diaphragm valve 8 constructed in accordance with the teaching of the present invention to provide an offset in the output of the sensor 2 and to thereby transmit an offset proportional pressure signal to a diaphragm valve unit 9.

The sensor 3 is interconnected to operate a four pipe unit ventilator system 10 which includes a hot water system 11 connected by a diaphragm valve unit 12 to the input side of a unit coil 13. The output of return side of the unit coil 13 is connected by a diaphragm valve unit 14 to the return side of the supply 11. A diaphragm valve unit 15 interconnects the supply side of a cold water supply 16 to the cold water inlet of the unit coil 13. The return side of the unit coil 13 is returned to the cold water supply by operation of the diaphragm valve unit 14. A damper 17 is modulated and positioned by a pneumatic damper motor 18 in a selective manner in accordance with heating or cooling, with a step-type transfer at a selected pressure output signal from the sensor 3. Thus, the output line 19 from the sensor 3 is connected directly to the diaphragm valve unit 12 and modulates the position of the valve during the heating cycle. Thus as the temperature increases the output pressure at line 19 increases. This reduces or modulates the hot water flow circulating through the unit coil 13 to correspondingly modify the temperature in the room or area sensed by the sensor 3 until such time as a balanced condition is established. The line 19 is also connected via a coupling line 20 through a fluid activated valve 21 to the damper motor 18. Until the pressure in line 19 reaches a selected level the fluid flow is directly through the valve 21 to correspondingly position and monitor the position of the motor 18 and consequently the damper 17.

The sensor line 19, in accordance with the present invention, is also connected to an input line 22 of a specially constructed "pop" valve 23, which is responsive to a predetermined preset pressure to switch from a heating cycle to a cooling cycle. For example, the output of the sensor 3 may modulate the heating valve unit 12 over a range of 4 to 9 psi. At 9 psi the valve unit 12 is closed to completely terminate the hot water circulation and simultaneously the pop valve 23 is actuated to insert modulation and actuation of the valve units 14 and 15 to establish a cooling cycle. Thus the output of the pop valve 23 provides a pressure signal at a main modulating line 24 connected as the inputs to the modulating valve 15 and to the switchover return valve unit 14. Thus, when the pressure signal at line 24 rises, the valve 14 is actuated to interconnect the output of the unit 13 to the cold water return. Simultaneously, the pressure valve unit 15 is modulated to introduce cold water through the unit coil 13 to thereby establish a cooling cycle. If the temperature drops to the desired preset level, the pressure signal drops below the 9 psi switch-over level. The pop valve 23 will then reset and the system again reverts to the heating cycle.

The output of the valve 23 is also connected via a switching line 25 to the control input or actuating side of the damper motor control valve 21. Thus, when the valve 23 is actuated, a pressure signal is impressed on the valve 21 which closes the connection of line 20 to the damper motor 18 and connects the motor directly to the output of a pressure regulating valve 26, the input side of which is connected to the line 24. The pressure regulating valve 26 establishes a constant pressure of a selected level signal to the damper motor 18. This is generally selected to establish and maintain a minimum damper opening for fresh air to pass through the damper unit. The valve 23 provides a simple, automatic low cost switching between heating and cooling cycles, while maintaining the use of conventional similar operators throughout the unit ventilator system.

As previously noted, the valve 23 is specially constructed to provide a reliable switching position and a preferred construction in accordance with this invention is shown in FIG. 2 including an adjustable set point pressure and a preselected differential pressure response. Thus in a practical system the pop valve unit shown in FIG. 2 can be accurately set to provide the 9 psi switch-over point with a differential of plus and minus of one-half psi.

Referring particularly to FIG. 2, the illustrated valve 23 has an input port 27 connected to the line 22 and providing flow through an inlet passageway including a valve opening or orifice 28 coaxially aligned with a diaphragm unit 29 which is adapted to open and close said inlet or passageway. The diaphragm unit 29 establishes a first chamber 30 to the same side of the diaphragm unit as the inlet opening 28. An outlet passageway 31 is connected to the chamber 30 and to the output line 24. The passageway 31 includes a flow restrictor shown as an orifice 32 to delay the pressure signal transfer.

The diaphragm unit 29 defines a second chamber 33 to the opposite side thereof which is connected via a passageway 34 to the outlet passageway 31 downstream of the orifice 32. The chamber 33 is provided with an exhaust passageway 35 having a flow restrictor or orifice 36 at the chamber end. The passageway 35 is formed in coaxial alignment with the diaphragm unit 29 and is adapted to be sealed by the movement of the diaphragm unit 29 from sealing engagement with the inlet unit opening 28. In the normal position, the diaphragm unit 29 is biased by a spring 37 to close the opening 25. More particularly, the illustrated pop valve unit 23 includes a lower housing unit 38 and an upper housing portion or body 39 interconnected to each other with a peripheral portion of a diaphragm 40 clamped therebetween in a fluid tight seal as a result of suitable clamping bolts or the like not shown. The diaphragm or the body portions 38 and 39 are recessed to define the appropriate chambers 30 and 33 to the opposite side of the diaphragm 40 which is sealed to and forms a part of the diaphragm unit 29.

The diaphragm 40 is formed of a suitable resilient material and preferably is formed of a convoluted diaphragm with an encircling convolution within the clamped portion and the center valve assembly.

The center valve assembly includes a lower sealing disc 41 having a depending annular sealing lip or seat 42 located in spaced relation to the outer peripheral disc edge and adapted to rest on the inner planar valve seat of the inlet opening 28, as shown in full line illustration in FIG. 2. The assembly 29 includes a similarly shaped upper disc 43 having an upwardly standing annular seat 44 also located generally centrally of the disc 43 and concentrically of the passageway 35. The upper disc further includes an attachment pin 45 projecting downwardly through the lower disc with the upper end of the coil spring 37 secured thereto. The spring 37 in the illustrated embodiment extends downwardly through the inlet passageway with the lower end secured to a swivel anchor 46 which extends through and bears on an annular nut 47. Body portion 38 includes a downwardly extending tubular portion integral with the inlet passageway and the extension is internally threaded to receive the nut 47. The lower end of the opening may be sealed such as by a sealing nut 48. The rotation of the nut 47 axially positions the nut and anchor 46. The rotating bearing mounting permits the axial adjustment without twisting of the spring.

The upper portion of the housing 39 includes an upward axial projection within which a cylinder element 49 is threadedly mounted to provide an axial adjustment means. The element 49 includes the passageway 35 coaxially aligned with the annular seat 44 of the upper disc 43 of the diaphragm unit 29. The lower end of the element 49 is flat faced and defines the seat for the annular valve seat 44, such that the upward movement of the diaphragm assembly 29 provides a fluid tight sealing off of the passageway 35 from chamber 33. An O-ring seal 50 is disposed between the cylinder element 49 and the adjacent body portion 39 to maintain a fluid type chamber 33 except for the exhaust passageway 35. A lock nut 51 permits locking of the elements 49 in preselected spacing with respect to the valve assembly or the diaphragm assembly 29.

In operation, therefore, the spring 37 will hold the opening 28 closed until the pressure from the supply line 22 reaches a selected level, at which pressure, the diaphragm unit 29 moves upwardly to open the passageway 28 to chamber 30. As soon as this happens, the pressure in the chamber 30 tends to rise and is applied across the valve assembly and particularly the total area of disc 41 of the diaphragm unit. This results in a sudden increase in force of the diaphragm unit 29 causing the latter to move upwardly until the upper disc seat 44 of the diaphragm unit 29 seals against the passageway element 49 and thereby closes the passageway 35. Pressure is now transmitted through the outlet and particularly the flow restrictor 32 and the outlet passageway 31 to modulate the signal at line 24 and thus switches the return valve 14 from a heating to a cooling cycle connection and modulates the position of cooling valve 15.

The orifice 32 causes the pressure in chamber 30 to rise rather rapidly as the valve opens to provide a rapid transfer, and slightly delays the transfer of the signal pressure via the line 31 and passageway 34 to the chamber 33. The diaphragm unit 29 can therefore move upwardly to seal the passageway 35 before the pressure in chamber 33 approaches the level of the pressure in chamber 30. This also establishes a greater effective area of the disc 41 within the chamber 30 than on the disc 43 in chamber 33 such that a fluid holding force exists acorss the diaphragm unit 29 which is sufficient to overcome the force of spring 1. The pressure must then reduce by some degree in excess of the initial transfer or switching pressure in order to reverse and cause the diaphragm unit 29 to move from the sealing of passageway 35. If the pressure drops, however, to the reduced switching level and the diaphragm unit 29 tends to move from the passageway to open the passageway 35, the effective area of the diaphragm disc 43 in chamber 33 equals that of disc 41 within the chamber 30. The restrictor 36 in the exhaust passageway 35 prevent immediate loss of the pressure signal in chamber 33. Consequently, for a momentary period pressures are essentially similar in chambers 30 and 33, and the pressure in 33 may be even slightly higher than that in chamber 30 as a result of the restrictor 32. Consequently, the diaphragm unit 29 moves downwardly under the force of spring 37 and seat 42 seals over the inlet opening 28, thereby removing the inlet pressure from the chamber 30.

The fluid or air in chamber 33 and passageway 34, passageway 31, chamber 30 and the modulating valve units 14 and 15 which are connected to the line 34 are all vented via the exhaust passageway 35 to reset the unit.

The differential pressure required to cause the valve to open and to then close can be defined by the following equation:

$$\Delta P = P_s(A_2 - A_1)/A_2 - dS/A_2$$

where $\Delta P$ = Pressure differential between open and closed position of valve
$P_s$ = Pressure at which valve opens
$A_1$ = Area under valve disc 41
$A_2$ = Area under valve disc 43
$d$ = Free travel of valve discs 41 and 43 between seats 28 and 49
$S$ = Spring rate of spring 37

The differential pressure thus can be adjusted either by varying the position of the exhaust element 49 and therefore the travel of the spring 37 and/or the spring tension. Thus, the adjustable mounting of the passageway element 49 and the adjustable tensioning of the spring 37 permits adjustment of the set point and the pressure differential.

In this manner, the valve 23 unit can be set to cause the diaphragm unit 29 to move from the seating position at a preselected pressure with the diaphragm unit 29 moving upwardly to seal off the passageway 35 and transmit a signal for modulating pressure to the output line 24 for modulation of the diaphragm valve units 14 and 15 to effect a cooling cycle. This will be maintained until the modulated supply pressure appearing at line 22 drops by a preselected amount at which time slight movement of the diaphragm unit 29 uncovers the passageway 35 to expose the full disc 43 to the pressure of chamber 33 resulting in a rapid closing of the inlet passageway and removal of the signal from the line 24 as well as an exhausting of the several lines and chambers associated with valve 23. This resets the valve 23 to permit recycling.

The system, in summary, automatically transfers between the heating and cooling cycles in response to a preselected pressure related to a selected temperature condition as established by the sensors 3, with a regulated constant supply pressure at the input side of the sensors 3.

As previously noted the compressor 5 is adapted to establish a pressure in excess of the maximum operating pressure to be established at the line 19. The output of the compressor 5 is reduced to a constant supply pressure at line 4 through the special diaphragm regulator apparatus 6, a preferred construction of which is illustrated in FIG. 3.

The regulating valve 6 is a diaphragm unit similar to valve 23 and including a diaphragm 52 clamped between a lower body portion 53 and an upper body portion 54. The body portions 53 and 54 are recessed to define a lower chamber 55 and an upper chamber 56 with the diaphragm 52 forming a common wall therebetween. A valve disc assembly 57 is secured to the intermediate portion of the diaphragm unit with an O-ring seal 58 secured to the one side within chamber 55. The disc assembly selectively moves the seal against a lower valve seat in the body portion 53 concentrically of an inlet passagewway 59 which includes a lateral inlet port 60 connected to the pressure supply line 4. A coil spring 61 is secured to the underside of the valve disc assembly 57 and extends downwardly through the passageway 59 with the lower end secured to an anchor 62 which is rotatably mounted within an annular nut 63. The passageway 59 is threaded with the nut 63 threaded therein to axially position the anchor 62 and thereby determine the tension of the spring 61. The lower end of the passageway is releasably sealed as by the sealing nut 64. The position of the nut 62 determines the tension of spring 61 and therefore the pressure which must be supplied from line 4 via the unit 60, passageway 59 to the underside of the valve assembly 57 to cause it to rise upwardly and permit the pressure and fluid to flow into the chamber 55. An outlet passage 65 connects chamber 55 to atmosphere or other suitable exhaust such that when the valve assembly 57 moves upwardly the supply pressure at line 4 is variably connected to exhaust with the degree of exhaust modulated in accordance with the spacing of the valve seat 58.

The movement of the air between the valve ring 58 and the adjacent portion of the body causes a static pressure drop across the O-ring. This wouldd tend to permit the valve assembly 57 to move downwardly to a closed position. As soon as the ring 58 engaged the seat, however, the pressure would, of course, rise and would again lift the valve disc assembly 57. The opening and closing would occur quite rapidly with consequent chatter of the valve assembly 57. This, of course, is undesirable as it does not provide steady modulation of the pressure supply and adversely affects operation of the system. In accordance with this invention, the chamber or exhaust passageway is connected by a passageway 66 to the upper chamber 56. The passageway includes a restrictor 67 to establish a controlled transfer of the pressure from the chamber 55 to the chamber 56.

The wall of chamber 56 is specially constructed to minimize the chamber volume and thereby produce a high degree of damping. The walls of the illustrated chamber 56 generally conform to the facing side of the diaphragm assembly. Thus, the chamber wall includes an annular portion 68 overlying the outer surface of the diaphragm convolution and a central cylindrical portion 69 generally corresponding to and aligned with the valve disc assembly 57. The wall portions 68 and 69 are spaced from the diaphragm unit with assembly 57 sealing the inlet passageway 59 and permits the upward movement of the valve disc assembly 57 to adequately exhaust the supply line 4 but to otherwise minimize the volume of the chamber 56.

As the valve disc assembly 57 opens to provide a transfer or exhausting of the supply line 4, a pressure increase in chamber 55 is created. A portion of the pressure signal will also be transmitted to chamber 56 via passageway 66 and restrictor 67. As noted, the drop across O-ring seal 58 also causes a slight reduction in the pressure of inlet 59 with the tendency for the valve assembly 57 to close. This is now, however, opposed by the aspiration of the fluid from chamber 56. This action thus dampens the chattering effect or tendency of the valve disc assembly 57. The degree of damping is effected by the volume of the chamber 56 as well as the size of the orifice 67. Thus as the size of the orifice or restriction 67 is increased the degree of damping will be reduced.

Applicant has found that the diaphragm valve 6 with the interconnecting passageway 66 providing a controlled pressure transfer between the two chambers provides a highly reliable zero differential pressure relief valve. The pressure at line 4 can be selected at a desired pressure within the design range of the apparatus by the positioning of the nut 63 with the corresponding tensioning of the spring 61. The valve disc assembly 57 will move upwardly at the desired supply line pressure and continuously modulate the exhausting from line 4 in accordance with increases and decreases of the output compressor unit. The valve disc assembly 57 is dampened reliably to prevent the chatter type movement associated with the diaphragm unit in the absence of the controlled interconnecting passageway.

A constant supply pressure is therefore provided to the several sensors 1, 2 and 3, with the sensor 1 providing a direct proportional operation of the diaphragm valve unit 7 and the sensor 3 providing the modulated heating and cooling cycles as heretofore discussed.

Figure 4:
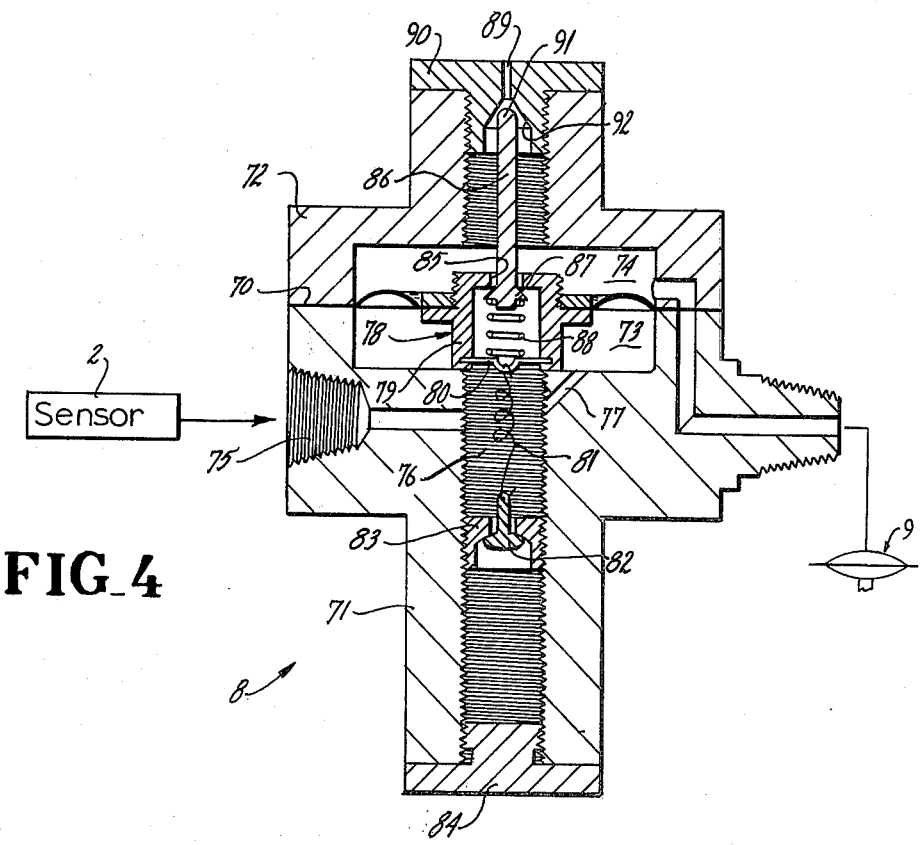
FIG. 4 is a cross-sectional view through a diaphragm valve apparatus introducing a constant pressure drop in the controlled pressure transmitted to a valve positioner as shown in FIG. 1.

The output of the sensor 2 is also a corresponding proportional pressure signal which is applied via the pressure offset unit or valve 8 to actuate the valve unit 9. The offset valve unit 8 is also a disphragm valve apparatus having a controlled interconnection of the two diaphragm valve chambers and a preferred construction of which is shown in FIG. 4.

More particularly, valve unit 8 includes a diaphragm 70 clamped between a lower body portion 71 and an upper or opposed body portion 72 with the body portions recessed to the opposite sides of the diaphragm to define a first chamber 73 and a second chamber 74. An inlet port 75 is connected to the output of the sensor 2. An inlet passageway 76 is formed as a lateral extension of the port 75 and extends axially through the body portion 71. A coupling passageway 77 extends between the passageway 76 and the chamber 73 to by-pass a valve disc assembly 78 connected to the center of the diaphragm 70 and ensures that inlet 75 always communicates with chamber 73. The chamber 73 is continuously subjected to the inlet passageway pressure which corresponds to the output pressure of the sensor 2. The disc assembly 78 includes a tubular disc 79 secured to the diaphragm 70. The lower end of the tubular disc 79 is a planar end which stops on the base of chamber 73 concentrically about passagewway 76. Disc 79 defines an extension of passageway 76 for providing controlled communication between the inlet passageway 76, the chamber 73 and the second chamber 74. A spring bracket 80 is secured to the underside of the assembly 78 and a bias coil spring 81 is secured to the bracket as by a hook connection and extends coaxially downwardly through the passageway 76. The opposite end of the spring 81 is connected to an anchor 82 having a bearing head disposed within an annular nut 83. The passageway 76 is threaded to allow axial positioning of the nut 83 and therefore the anchor 82 without twisting of the coil spring 81. The lower end of the passageway 76 is closed by a sealing nut 84.

The coil spring 81 thus biases the assembly 78 including disc 79 downwardly into engagement with the passageway 76. However, inlet chamber 73 by means of by-pass 77 remains interconnected to inlet 75. The disc 79 is generally cup-shaped and extends through the diaphragm 70 with the base located within the chamber 74. The base of the disc 79 is formed with a valve opening 85 through which a rod-like valve stem 86 projects. The end of stem 86 within disc 79 includes a conically shaped valve seat 87 which seats against the lower edge of the valve opening 85 to seal the passageway and thereby seal communication of the second chamber 74 with respect to the inlet passageway 76 and the first chamber 73. A coil spring 88 is disposed within the cup-shaped disc 79 and thus within the valve assembly and acts between the bracket 80 and the underside of the valve seat 87 to continuously urge the valve seat 87 into a sealing engagement with the edge of opening 85.

The valve stem 86 extends coaxially upwardly with the opening 85 with the upper end aligned with an orifice 89 formed in the upper wall of the chamber 74. In the embodiment of FIG. 4, a nut member 90 is threaded into a cylindrical extension of the body 72 with the orifice 89 formed therein. The uppermost end of the stem is rounded as at 91 and the inlet portion of the orifice 89 is correspondingly conically shaped as at 92 such that selected upward movement of the stem 86 results in a sealing engagement of the rounded tip 91 with the conically shaped inlet 92 of the orifice 89.

In operation, as the inlet pressure, corresponding to the output pressure of the sensor 2, in the chamber 73 rises at a selected level corresponding to the desired offset of the system and the valve assembly 78 causing it to rise upwardly carrying the valve assembly 78 which moves from the stop about passageway 76.

The tension of spring 81, of course, determines the required initial pressure required to move the valve assembly. Full inlet pressure is now applied to chamber 73 to cause rapid opening movement of the assembly 78. The valve seat 87 is held in sealing engagement with the edge of the disc opening 85 to prevent the transfer of pressure to the second chamber 74. The assembly 78 first moves sufficiently to cause the upper end 91 of stem 86 to engage and seal the conical input 92 to the orifice 89. The further movement of disc 79 results in the movement of the disc base and thus opening 85 from the conical seat 86 thereby providing communication from chamber 73 into the second chamber 74.

An outlet passageway connects the chamber 74 to the output line for modulated control of the associated valve unit 9 for all pressure above the offset level. Applicant has found that there is a very small pressure change which, for the previous order of operating pressures, is less than 0.1 psi required to move the respective valve seats from the position of both being closed to both open. Thus the full supply pressure is essentially transmitted to the output passageway to modulate and operate the valve unit 9.

As the pressure decreases, the pressure in chamber 74 will tend to be slightly above the input pressure and move the diaphragm assembly to the closed full-line position shown. A pressure drop in the output of the sensor 2 below the selected offset level results in the reverse of the sequencing. Thus, the valve assembly 78 and particularly disc 79 move downwardly to engage the valve seat 87 to close the opening 85 and remove the input pressure signal from the output chamber 74. Any further drop in the input pressure level will result in the further downward movement of the assembly 78 carrying the rod 85 downwardly to open the exhaust orifice 89. This will allow the trapped pressure fluid within the chamber 74, passageway and operator of valve unit 9 to exhaust to the atmosphere via orifice 89 thereby resetting the system until the signal pressure again rises above the selected offset.

In the operation of a system of FIG. 1, valves 7 and 9 are operated in predetermined sequence, with the valve 7 operating over the desired lower range and the valve 9 only operating after the signal rises above a selected level.

The particular constant pressure drop to be introduced into the circuit is determined in the illustrated embodiment of the invention by the setting of the coil spring 81. The diaphragm apparatus with constant pressure drop employs the controlled interconnection of the two chambers generally as in the previous valve units to produce a desired and improved fluid regulating control. The diaphragm valve apparatus of this invention is relatively simple, reliable and inexpensive and permits the use of relatively standard operating components and the design and construction of the overall control system.

Although separate sensors are shown, a single sensor may actuate the several separate valve sub-systems. For example, the output of the sensor 1 may be connected to directly drive valve 7 and also connected through the offset unit 8 to drive the valve 9 to operate them in a desired sequence in response to the one condition being sensed.

Various modes of carrying out the invention are contemplated as being within the scope of the following claims, particularly pointing out and distinctly claiming the subject matter which is regarded as the invention.

I claim:

1. A diaphragm valve apparatus for establishing a regulated pressure in a pressure line comprising a valve body having a pair of chambers separated by a common flexible diaphragm member, an inlet passageway means terminating in a first of said pair of chambers and having means adapted to be connected to the pressure line, a control passageway means connecting said first chamber to said second chamber, said diaphragm member having a valve means associated with said inlet passageway means and adapted to open and close said inlet passageway means, said diaphragm member resiliently holding the valve means to close said inlet passageway means and responsive to a preselected inlet pressure in said inlet passageway means to move said diaphragm member and said valve means to transmit pressure through said control passageway means between the first and the second of said pair of chambers, said valve means includes a seal valve element coaxially encircling the inlet passageway and adapted to be moved between sealing engagement with the adjacent surface of the inlet passageway and spaced therefrom, said valve means being held partially open to produce a pressure drop across said valve means and thereby establishing a regulated pressure in said line, an exhaust passageway connected to said first chamber, said control passageway providing direct connection between said first chamber and said second chamber and including a flow restriction means to prevent chatter movement of the valve element.

2. The diaphragm valve apparatus of claim 1, wherein said second chamber conforms essentially to the configuration of the diaphragm and valve means and being spaced therefrom to establish a minimum volume in said second chamber required to permit opening of the inlet passageway for exhausting of the flow.

3. The diaphragm valve apparatus of claim 2, wherein said valve means includes a valve disc secured coaxially and centrally to the diaphragm and in spaced relation to the edge of the chamber, said diaphragm including a convolution between the disc and edge of the chamber and projecting into the second chamber.

4. The diaphragm valve apparatus of claim 1, wherein said seal element is a valve disc secured coaxially and centrally to the diaphragm member and in spaced relation to the edge of the chamber, an O-ring seal element secured to said disc and coaxially encircling the inlet passageway and adapted to be moved between sealing engagement with the adjacent surface of the inlet passageway and spaced therefrom, said diaphragm member having a convolution located between the valve disc and the edge of the chamber and projecting into the second chamber, said second chamber conforming essentially to the configuration of the diaphragm member and valve means and being spaced therefrom to establish a minimum volume in said second chamber required to permit opening of the inlet passageway for exhausting of the flow, said control passageway providing direct connection between said first chamber and the outer portion of said second chamber, a coil spring means secured to said disc and extending downwardly through the inlet passageway, an anchor means secured to the outer end of the coil spring and being axially movable to vary the tension in said coil spring means without twisting of the coil spring means.

5. A pressure control system, comprising a pressure source establishing an output pressure in excess of the desired operating pressure, a pressure relief valve means having a diaphragm as a common wall between a first chamber and a second chamber, said first chamber having an inlet passageway connected to said source, a seal element connected to the diaphragm and coaxially encircling the inlet passageway and adapted to be moved between sealing engagement with the adjacent surface of the inlet passageway and spaced therefrom to establish a controlled pressure drop from said pressure source, an exhaust passageway connected to said first chamber to exhaust the pressure from said first chamber and thereby reduce the pressure in said inlet passageway to a selected level, said valve means being held partially open to produce a pressure drop across said valve means and thereby establishing a regulated pressure in said line, a control passageway providing direct connection between said first chamber and said second chamber and including a flow restriction means to dampen movement of said diaphragm and thereby prevent chatter movement of the seal element.

6. The diaphragm valve apparatus of claim 5, wherein said second chamber conforms essentially to the configuration of the diaphragm and valve means and being spaced therefrom to establish a minimum volume in said second chamber required to permit opening of the inlet passageway for exhausting of the flow.

* * * * *